United States Patent [19]
Otto

[11] Patent Number: 4,819,949
[45] Date of Patent: Apr. 11, 1989

[54] SHIELDED SEAL ASSEMBLY
[75] Inventor: Dennis L. Otto, Malvern, Ohio
[73] Assignee: Timken Company, Canton, Ohio
[21] Appl. No.: 124,814
[22] Filed: Nov. 23, 1987

Related U.S. Application Data
[63] Continuation-in-part of Ser. No. 79,175, Jul. 29, 1987, which is a continuation of Ser. No. 811,657, Dec. 19, 1985, abandoned.

[51] Int. Cl.$^4$ ............................................. F02F 11/00
[52] U.S. Cl. .................................. 277/29; 277/133; 277/134
[58] Field of Search ................. 277/29, 37, 3, 53, 134, 277/133, 212 F, 215; 384/486, 489

[56] References Cited

U.S. PATENT DOCUMENTS

| | | |
|---|---|---|
| 2,055,532 | 9/1936 | Hektner . |
| 2,277,979 | 3/1942 | Horger . |
| 2,834,616 | 5/1958 | Gebert et al. . |
| 2,871,037 | 1/1959 | Johnson et al. . |
| 2,879,114 | 3/1959 | Bowen . |
| 2,977,138 | 3/1961 | Brittain . |
| 3,021,161 | 2/1962 | Rhoads et al. . |
| 3,029,082 | 4/1962 | Horger . |
| 3,341,265 | 9/1967 | Paterson . |
| 3,363,911 | 1/1968 | McKinven . |
| 3,363,952 | 1/1968 | Paterson . |
| 3,472,519 | 10/1969 | Gehret . |
| 3,494,681 | 2/1970 | Anderson . |
| 3,494,682 | 2/1970 | Keller . |
| 3,628,837 | 12/1971 | Otto . |
| 3,639,016 | 2/1972 | Bourgeois . |
| 3,682,488 | 8/1972 | Matsushima .......................... 277/37 |
| 3,741,615 | 6/1973 | Otto ...................................... 277/37 |
| 3,790,178 | 2/1974 | Cameron .............................. 384/489 |
| 3,790,238 | 2/1974 | Otto . |
| 3,841,723 | 10/1974 | Kelso . |
| 4,165,881 | 8/1979 | Salter ..................................... 277/95 |
| 4,252,329 | 2/1981 | Messenger ........................... 277/37 |
| 4,448,461 | 5/1984 | Otto . |
| 4,522,515 | 6/1985 | Miki et al. ............................ 384/571 |
| 4,669,895 | 6/1987 | Colanzi et al. ....................... 384/486 |

Primary Examiner—Lenard A. Footland
Attorney, Agent, or Firm—Edward A. Boeschenstein

[57] ABSTRACT

A seal assembly for closing the end of a bearing includes a seal and a shield on which the seal is captured. The shield has an axially directed mounting portion, an axially directed overhang and a radial end wall between the mounting portion and overhang. The seal has a pumping labyrinth presented toward the mounting portion, yet spaced from it, a dirt lip directed obliquely toward and contacting the mounting portion, and a secondary lip directed obliquely toward, yet normally spaced from, the overhang, with the dirt lip being between the labyrinth and the secondary lip. The labyrinth is exposed toward the interior of the bearing and has pumping cavities which impel lubricant back into the bearing. Between the dirt and secondary lip is a groove which opens toward the radial wall of the shield, and this groove contains a ring of grease-type lubricant which extends to and adheres against the radial wall, thus forming a barrier to the ingress of contaminants. The ring of lubricant may become temporarily pressurized, in which event it will deflect the secondary lip against the overhang of the shield to prevent excessive leakage, yet the pressure will be relieved through vent notches in the contacting edge of the lip.

21 Claims, 2 Drawing Sheets

1

SHIELDED SEAL ASSEMBLY

RELATED APPLICATION

This application is a continuation-in-part of application Ser. No. 79,175, filed July 29, 1987, which in turn is a continuation of application Ser. No. 811,657, filed Dec. 19, 1985, now abandoned.

BACKGROUND OF THE INVENTION

This invention relates in general to sealing shafts and the like and more particularly to a seal and shielded seal assembly.

A type of antifriction bearing, known as an all-purpose bearing, exists which is furnished as a sealed self-contained assembly that is preset and prelubricated. As such, the bearing is simply fitted over an axle journal and into a housing to enable the axle to rotate relative to the housing or vice versa. All-purpose bearings have experienced wide-spread use on axles of railway cars, but they are also used in other applications, such as for crane wheels, table rolls and shears, and even for the work rolls of rolling mills.

All-purpose bearings often operate in hostile environments, and this is particularly true when they are used at the journals of railway cars. Here they are subjected to contaminants, such as moisture and road grit, which must remain out of the bearing interiors to prevent premature failure of the bearings. Hence, the presence of seals at the ends of all-purpose bearings.

The typical seal for an all-purpose bearing has a seal case which is fitted to the outer race of the bearing and an elastomeric seal element which is bonded to the seal case and bears against a wear ring at the end of one of the inner races for the bearing. Actually, the seal element contacts the wear ring at two axially spaced locations, namely along a primary lip that is on the so-called oil side of the seal and also along dust or secondary lip that is on the air side. A garter spring encircles the primary lip to urge it snugly against the wear ring, where it is supported on a thin, yet continuous, film of lubricant, known as an elastohydrodynamic oil film. The dust lip likewise bears against the wear ring, but merely under the bias of the elastomer from which the seal element is molded. The primary lip establishes a very effective barrier to the migration of the lubricant along the wear ring—so effective that it is not uncommon for the dust lip to starve for lubrication and overheat. This, hardens the elastomer and diminishes the effectiveness of the seal. Aside from that, the two lips acting against the wear ring impart a measure of resistance to rotation, and that resistance requires torque to overcome—torque which could otherwise be utilized in performing useful work.

Furthermore, the typical all-purpose bearing of current construction when mounted on an axle journal, has no overhangs or other protection for the seals at the ends of the bearing, and hence the seals are exposed directly to contaminants on their air sides. Should a seal be the least bit defective, it may admit the contaminants to the interior of the bearing that it is designed to protect.

The seal of the present invention operates with considerably less torque than conventional seals of the type currently utilized with all-purpose bearings. Moreover, it establishes at least two barriers to the migration of contaminants. It further operates in conjunction with a shield that provides an overhang for excluding contaminants and even deflecting them away from the seal.

DESCRIPTION OF THE DRAWING

In the accompanying drawings which form part of the specification and wherein like numerals and letters refer to like parts wherever they occur.

DETAILED DESCRIPTION

Figure 1:
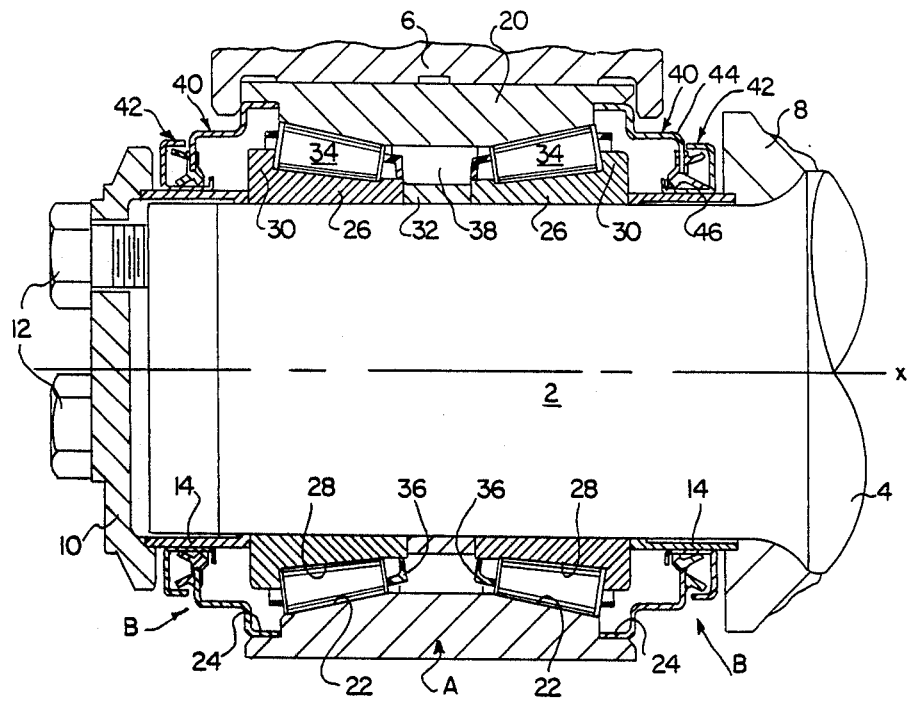
FIG. 1 is a sectional view of an all-purpose bearing provided with seal assemblies constructed in accordance with and embodying the present invention.

Referring now to the drawings a self-contained bearing A (FIG. 1), which is prelubricated and preset, fits around a journal 2 on the end of an axle 4 and is received in an adapter or some other containing structure 6, all for the purpose of permitting the axle 4 to rotate easily with respect to the containing structure 6, about an axis x of rotation. Actually the bearing A is clamped on the journal 2 between a backing ring 8 and an end cap 10, the latter being urged toward the former by cap screws 12 which thread into the end of the journal 2. Neither the ring 8 nor the cap 10 bears directly against the bearing A, but instead they exert the clamping force through spacer rings 14 that likewise encircle the journal 2. The ends of the bearing A are closed by seal assemblies B, which for the most part exist around the spacer rings 14.

Briefly considering the bearing A first, it includes (FIG. 1) a double cup 20 having a pair of inwardly presented raceways 22 and at the large diameter ends of those raceways 22 cylindrical counterbores 24 which run out to the ends of the cup 20. It is across these ends of the cup 20 that the bearing A is held within the containing structure 6. The cup 20 surrounds a pair of cones 26 which fit around the axle journal 2 where they are separated by a spacer 32. Each cone 8 has a tapered raceway 28 which faces and indeed is encircled by one of the cup raceways 22, and that cone raceway 28 leads out to a thrust rib 30 which in turn ends at a back face. The spacer rings 14 bear against the cones 26 at the cone back faces, and hold the two cones 28 and the spacer 32 tightly together. The cup 20 and cones 26 are concentric about the axis x of rotation.

In addition to the double cup 20 and the two cones 26, the bearing A has tapered rollers 34 (FIG. 1) which are arranged in two rows corresponding to the sets of opposed raceways 22 and 28 on the cup 20 and cones 26. Thus, a separate row of rollers 34 surrounds each cone 26. Along their large end faces the rollers 34 abut against the thrust ribs 30 for their respective cones 26, so that the thrust ribs 30 prevent the rollers 34 from being expelled from the spaces between the raceways 22 and 28 when the bearing A is subjected to radial loads. Each row of rollers 34 carries a cage 36 which maintains the proper spacing between adjacent rollers 34, and further holds the rollers 34 of that row around the cone 26 when the cone 26 is removed from the cup 20. The tapered rollers 34 of the two rows and the cages 36 for those rollers 34 move within a sealed or isolated annular cavity 38 which is closed at its ends by the seal assemblies B.

In the operation of the bearing A, the tapered rollers 34 in the two rows move along the raceways 22 and 28, and to reduce friction, particularly between the large end faces of the rollers 34 and the thrust ribs 30 of the two cones 26, a supply of grease-type lubricant exists within the annular cavity 38. Indeed, the tapered rollers 34 tend to pump the lubricant toward the thrust ribs 30. The seal assemblies B generally occupy the annular spaces between the surfaces of the cup counterbores 6 and the rings 14 that are located beyond the cone thrust ribs 30. The seal assemblies B prevent the lubricant from escaping, and further exclude dirt, water and other contaminants from the interior of the bearing A. Thus, the seal assemblies B serve to isolate the annular cavity 38 that exists between the cup 20, on one hand, and the two cones 26, on the other, yet the seal assemblies B require little torque to overcome the friction that is inherent in them. Since the cavity 38 contains the tapered rollers 34, it experiences wide variations in temperature, but these variations do not significantly affect the pressure within the cavity 22 since the seal assemblies B further provide a vent for the cavity 22.

Each seal assembly B includes a seal 40 and a shield 42 which is interlocked with the seal 40. The seal 40 has a rigid case 44 and a flexible sealing element 46 which is bonded to the case 44 and is, in effect, captured on the shield 42 so that the seal 40 interlocks with the shield 42 in the region of the seal element 46. Preferably, the seal element 46 is molded from an elastomer. The seal case 44 projects from the counterbore 24 at one end of the double cup 20, whereas the shield 42 fits tightly around the spacer ring 14 toward which that counterbore 24 opens. A static seal exists between the surface of the counterbore 6 and the seal case 44 and another exists between the shield 42 and the ring 14 which it surrounds.

Figure 2:
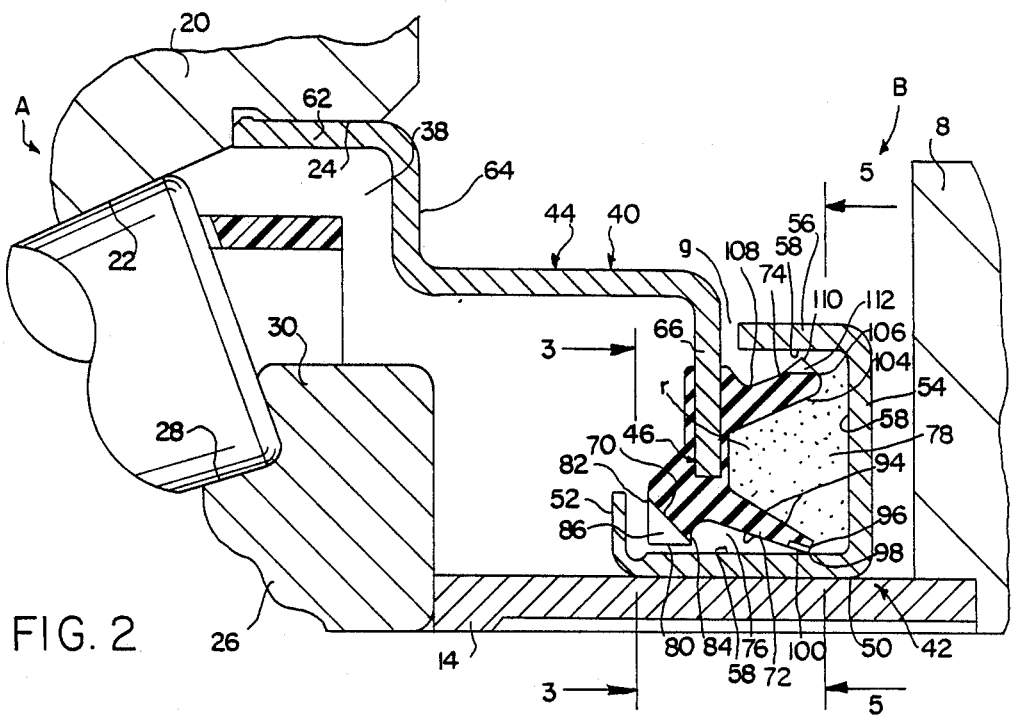
FIG. 2 is an enlarged partial view of one of the seal assemblies.

The shield 42 is a unitary structure preferably formed as stamping from a metal such as steel. It includes (FIG. 2) an axially directed mounting portion 50 which fits around the spacer ring 14, its diameter being such that an interference fit exists between it and the ring 14. At its one end, that is the end which is closest to the bearing A, the shield 42 has a curl 52 which turns radially outwardly from the mounting portion 50 and lies along the back face of the thrust rib 30 for the bearing cone 26. The curl 52 projects radially generally no further than the cylindrical outer surface of the thrust rib 30. At its other end, the shield 42 has an end wall 54 which is likewise directed radially outwardly from the mounting portion 50—indeed, substantially farther then the curl 52. Even so the wall 54 does not extend outwardly beyond the seal case 44, but instead is of a lesser diameter. At its outer margin, the wall 54 merges with an overhang 56 which is directed axially over the mounting portion 50, but is considerably shorter. The outwardly presented face of the mounting portion 50, that face of the end wall 54 that is presented toward the annular cavity 38 of the bearing A, and the inwardly presented face of the overhang 56, together constitute a sealing surface 58 with which the seal element 46 of the seal 40 cooperates to establish several barriers that retain the lubricants within the annular cavity 38 of the bearing A and exclude contaminants, all without demanding excessive torque that would otherwise impair relative rotation between the two. In effect, the sealing surface 58 has three sections—two axial sections, one along the mounting portion 50 and the other along the overhang 56, and a connecting radial section along end wall 54.

Turning now to the seal 40, its rigid case 44, which may be metal stamping, preferably of steel, includes a cylindrical mounting portion 62, a stepped intermediate portion 64, and a radially directed bonding portion 66. The mounting portion 62 fits into the counterbore 24 of double cup 20 where it interlocks with the cup 20 to effect a static seal. Immediately beyond the end of the cup 20, the mounting portion 62 merges into the stepped intermediate portion 64 which is of a lesser diameter and provides a shoulder against which an axially directed force may be applied to the seal case 44 to press the mounting portion 62 into the counterbore 24 of the cup 2. The intermediate portion 64 is spaced outwardly from the thrust rib 30 and projects partially over the ring 14 and the mounting portion 50 of the shield 42. It merges into the bonding portion 66 intermediate the ends of the ring 14, yet short of the overhang 56 for the shield 42, and well it should, for the diameter of the intermediate portion 64 is greater than the diameter of the overhang 56. The bonding portion 66 extends radially inwardly past the overhang 56 of the shield 42, but its inner edge is spaced from the mounting portion 50 of the shield 42. Between the free end of the overhang 56 of the shield 42 and the radially directed bonding portion 66 of the seal case 44, a small annular gap g exists.

The seal element 46, which is preferably molded from an elastomer, but may be formed from other flexible materials such as polymers, includes a pumping labyrinth 70, a dirt lip 72, and a secondary lip 74 arranged in that order along the sealing surface 5B of the shield 42 from the curl 52 to the overhang 56. The pumping labyrinth 70 and dirt lip 72 work along the inner axial section of the surface 58, which is the section on the mounting portion 50, while the secondary lip 74 works along the outer axial section of the surface 58, which is the section on the overhang 56. Between the pumping labyrinth 70 and the free end of the dirt lip 72 is a shallow annular groove 76 which opens toward the inner axial section of the sealing surface 58. Between the dirt lip 72 and the secondary lip 74 is a much larger and deeper annular groove 78 which opens toward the radial section of the sealing surface 58 that is along the end wall 54 of the shield 42.

Figure 3:
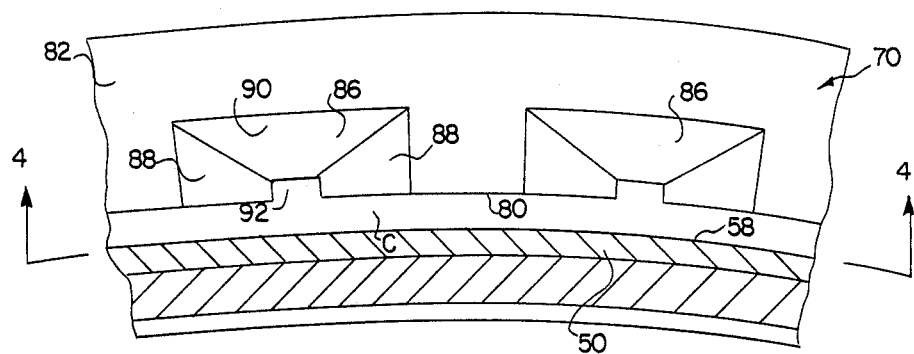
FIG. 3 is a fragmentary sectional view of the seal assembly taken along line 3—3 of FIG. 2.
Figure 4:
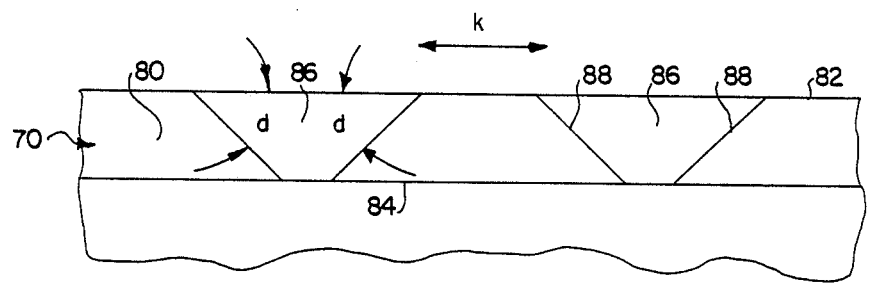
FIG. 4 is a sectional view of the seal assembly taken along line 4—4 of FIG. 3 and showing the face of the pumping labyrinth.
Figure 5:
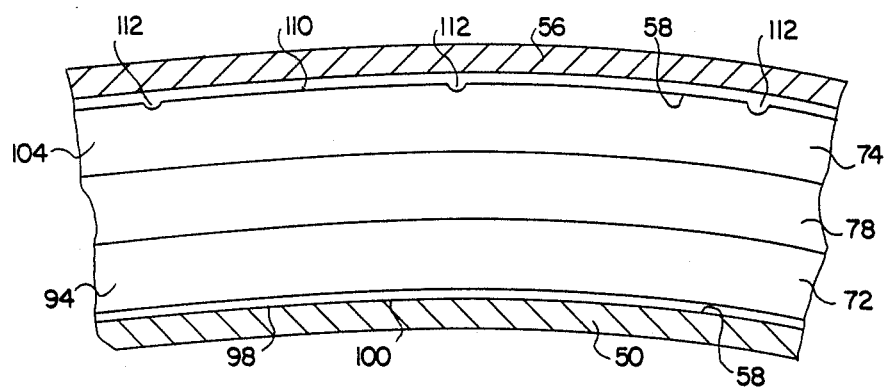
FIG. 5 is a fragmentary sectional view of the seal assembly taken along line 5—5 of FIG. 2.

Considering the pumping labyrinth 70 first, it turns radially inwardly and terminates at a circumferential or cylindrical face 80 which is presented toward, but is slightly greater in diameter than, the section of the sealing surface 58 on the mounting portion 50 of the shield 42. As a consequence, a slight radial clearance c exists between the sealing surface 58 and the face 80, and this clearance typically could range between 0.002 and 0.040 inches, this being a working clearance since some eccentricity between the labyrinth 70 and sealing surface 58 as the result of manufacturing tolerances may exist. On one side of the cylindrical face 80 is an inner end face 82 which is presented toward curl 52 and the sealed cavity 38 and on the other side is an outer end face 84 which is presented toward the dirt lip 72. Both faces are radial, that is they lie in planes which are perpendicular to the bearing axis x, and hence they are parallel to each other. Neither the cylindrical face 80 nor the inner end face 82 is continuous, but instead both are interrupted by small pockets or cavities 86 which are configured to pump or impel any lubricant that enters them back toward the tapered rollers 34, that is back into the sealed cavity 38. The pumping cavities 86 are arranged at equal circumferential intervals along the pumping labyrinth 70, with each cavity 86 opening out of both the cylindrical face 80 and the inner end face 82 of the primary labyrinth 70 and interrupting the edge at which those faces intersect. To effect the pumping or impelling action, each pumping cavity 86 has a pair of side faces 88 (FIGS. 3 and 4) which are located at equal angles d with respect to the direction of relative rotation k between the labyrinth 70 and sealing surface 58. The angle d should be between 30 degrees and 60 degrees and should preferably be 45 degrees. Thus, the side faces 88 intersect the cylindrical face 80 along lines which are oblique to the direction of relative rotation k between the pumping labyrinth 70 and sealing surface 58, which is, of course, the circumferential direction. Completing the cavity 86 is an outside connecting face 90 which extends between the two side faces 88 and is oriented at an oblique angle with respect to the cylindrical sealing surface, it being farthest from the cylindrical portion of the surface 58 at the inner end face 82. The two side faces 88 are planar, while the connecting face 90 may be planar or perhaps slightly concave. All three of the faces 88 and 90 intersect the outer end face 84, with the lines of intersection for the side faces 88 being spaced slightly apart and the line of intersection for the connecting face 90 being outwardly from the cylindrical face 80. The result is a small vent aperture 92 that opens out of the outer end face 84 toward the dust lip 72, that aperture of course being at the small end of the pumping cavity 86.

When the cone 26 rotates, lubricant that is between the sealing surface 58 on the mounting portion 50 of the shield 42 and the cylindrical face 80 of the pumping labyrinth 70 migrates into the pumping cavities 86 where it is deflected axially by the side faces 88. Actually, the rotation of the cone 26 not only causes the lubricant to flow into each cavity 86, but further causes it to come against one side face 88 of each cavity 86, and that side face 88, being at the angle d with respect to the direction of relative rotation k, which is of course the circumferential direction, deflects the lubricant back toward the sealed cavity 38 and the tapered rollers 34 within it. The connecting face 90, inasmuch as it is oblique to the axis x, also deflects lubricant back toward the sealed cavity 38 and allows lubricant, when subjected to the centrifugal forces generated by rotation of cone 26, to flow outwardly away from the axis x of rotation as the lubricant moves into the sealed cavity 38. By reason of their wedge-shaped configurations, the pumping cavities 86 will deflect the lubricant in the same axial direction, irrespective of the direction that the cone 26 rotates, and also irrespective of whether the cone 26 or cup 20 is the rotating race of the bearing A. In this regard, in one direction of rotation one side face 88 and the connecting face 90 of each cavity 86 will deflect the lubricant back toward the sealed cavity 38 that represents the interior of the bearing A, and in the other direction of rotation, the other side face 88 and connecting face 90 will likewise deflect the lubricant, again axially back toward the sealed cavity 38. The vent apertures 92 at the ends of the cavities 86 along with the clearance c between the cylindrical face 80 and the axial portion 50 of the shield 42 prevent the sealed cavity 38 from experiencing a significant increase in pressure.

The dirt lip 72 projects away from the pumping labyrinth 70, generally toward the radial end wall 54 of the shield 42, but nevertheless, contacts the inner axial section of the sealing surface 58 on the mounting portion 50 of the shield 42. The lip 72 has a pair of slightly convergent side faces 94 and an end face 96, as well as a sealing edge 98 where the inner of the two sides faces 94 and the end face 96 come together. For the most part, the lip 72 is formed from the elastomer of the seal element 46 as an integral part of that element, but embedded in its end is an annular insert 100 which is formed from a flexible polymer, such as polytetrafluoroethylene (PTFE). The sealing edge 98 exists along the insert 100 which is more resistant to wear than is the elastomer in the remainder of the lip 72. When the lip 72 is unrestrained, its diameter along the sealing edge 98 of the insert 100 is less than the diameter of the cylindrical face 80 of the pumping labyrinth 70 and also slightly less than the diameter of the axial section of the sealing surface 58 that is on the mounting portion 50 of the shield 42.

The dirt lip 72 fits around and bears against the sealing surface 58 along the mounting portion 50 of the shield 42. Having been expanded slightly to pass over the surface 58, it snugly embraces and is biased against the sealing surface 58. The sealing edge 98 is lubricated so that excessive friction does not develop between it and the surface 58. Indeed, the lubricant within the annular cavity 38 of the bearing A serves as a source for replenishing the lubricant along the sealing edge 98. In this regard, some lubricant from the cavity 38 will flow through the clearance c between the pumping labyrinth 70 and the sealing surface 58 when the bearing A is at rest or is operating at a very low speed, and this lubricant provides lubricant for the sealing edge 98, but the lubricant does not go beyond the sealing edge 98 during normal operation of the bearing A. Should the annular cavity 38 experience a quick rise in pressure, which may result from an increase in the temperature of the bearing, that increase in pressure will be transmitted through the clearance c and the vent apertures 92 to the underside of the dirt lip 72. If the rate of rise in pressure is great enough, the lip 72 may separate from the sealing surface 58 and vent the cavity 38. While this may result in the loss of some lubricant, it prevents the seal 40 from sustaining damage. Once the pressure is relieved, the lip 72 returns to its original configuration.

Whereas the dirt lip 72 extends obliquely toward the mounting portion 50 of the shield 42 against which it bears, the secondary lip 74 extends radially away from the mounting portion 50 and indeed toward the overhang 56, yet when not distorted, it does not contact any portion of sealing surface 58. Thus, in its as molded condition, the secondary lip 74 is spaced slightly inwardly from the axial section of the sealing surface 58 that lies along the overhang 56. The secondary lip 74 has an inside face 104 which cooperates with the outer of the two faces for the dirt lip 72 to provide the larger of the two grooves 78 in the seal element 46. The inside face 104 merges with an end face 106 which is presented toward the corner in the sealing surface 58 where the end wall 54 and the overhang 56 meet. On its other side, the secondary lip 74 has an outer face 108 which at one end leads up to and intersects the end face 106 at an edge 110. The outer face 108, which is presented outwardly to be exposed to the gap g between the end of the overhang 56 and the bonding portion 66 in the seal case 44, possesses a concave configuration and as such produces an outwardly directed drip groove in the lip 74. Water which enters the shield 42 through the top of the gap g flows into this groove which directs water away from the edge 110 and the end wall 54 of the shield 42, and indeed ensures that the water drops off of the lip 74 and through the bottom of the gap g. The outer face 108 together with the end face 106 create on the lip 74 a triangular section along which the edge 110 exists, and within this section are vent notches 112 which open outwardly toward the overhang 56 and thereby interrupt the edge 110. The notches 112 provide venting for the region at the large groove 78 when the edge 110 contacts the axial section of the sealing surface 58 that is along the overhang 56.

The seal 40 is fitted to the shield 42 with the curl 52 of the latter initially extended axially. Preferably, the axially directed curl 52 is aligned with a tapered mandrel over which the seal 40 is moved with its dirt lip 72 against the surface of the mandrel. The lip 72 expands as it moves up the taper on the mandrel and thus easily slides over the axially directed curl 52 and onto that section of the sealing surface 58 which is along the mounting portion 50. Once the seal element 46 is fully around the mounting portion 50, the curl 52 is turned outwardly to thus capture the seal 40 on the shield 42, and thereby create the unitized seal assembly B.

The bearing A is assembled by inserting the cones 26, with the rollers 34 and cages 36 around them, into the cup 20 along with a supply of grease-type lubricant, and the spacer rings 14 are aligned with the ends of the cones 26. Then each seal assembly B is forced over its spacer rings 14 and into the end of the bearing A with a punch having one face that bears against the shoulder or the intermediate portion 64 of the seal case 44 and a second face which bears against the end wall 54 of the shield 42. As such, the punch drives the mounting portion 62 of the seal case 44 into the counterbore 24 at one end of the double cup 20 and at the same time drives the mounting portion 50 of the shield 42 over the spacer ring 14. The seal assemblies B thus unitize the bearing A for handling purposes, in that they prevent the rings 14 from being withdrawn from the cones 26 and the cones 26 and rollers 34 from being withdrawn out of the ends of the cup 20. Also, the backing ring 8 is pressed onto one of the spacer rings 14. Thereafter, the bearing A along with its spacer rings 14 and backing ring 8 are pressed onto the journal 2, and the cap 10 is fitted to the free spacer ring 14 and secured with the cap screws 12.

Each seal assembly B operates with a ring r (FIG. 2) of the grease-type lubricant in the large groove 78 of the seal element 46 and indeed protruding outwardly from that groove to the end wall 54 of the shield 42 to which it adheres. The ring r of lubricant may be applied before the seal 40 is fitted to the shield 42, or it may be derived from the supply of lubricant placed within the annular cavity 38 during assembly of the bearing A. With regard to the latter alternative, the rollers 34 naturally pump the lubricant up their surfaces and toward the large ends of the raceways 22 and 28. If the bearing A is assembled with excessive lubricant, the rollers 34 will force some of this lubricant past the pumping labyrinth 70 and dirt lip 72 and into the large groove 78.

When the bearing B is placed in operation, the cones 26 rotate relative to the cup 20, and as a consequence, the tapered rollers 34 tend to pump some of the lubricant toward the thrust ribs 30 of the two cones 26, over the curls 52 and onto sealing surfaces 58 on the mounting portions 50 for the shields 42. This lubricant, encounters the pumping labyrinth 70 of each seal 40 and when not in excessive quantities, is for the most part returned toward the tapered rollers 34 and the annular cavity 38 in which they revolve. In particular, upon migrating along the sealing surface 58 on the mounting portion 50 of the shield 42 for either cone 26, the lubricant becomes caught in the pumping cavities 86 of the pumping labyrinth 70 for the seal 40 at that end of the bearing A, and here the side faces 88 of the cavities 86, inasmuch as they are oblique to the direction of relative rotation, drive the lubricant axially back toward the sealed cavity 38. The centrifugal force that is developed tends to fling the lubricant out into the pumping cavities 86 where it is deflected or impelled axially by the side faces 88 and both axially and radially by the connecting faces 90.

A very small quantity of the lubricant works its way under the cylindrical face 80 of the pumping labyrinth 70 or perhaps through the vent apertures 92 in that labyrinth, and passes on to the edge 98 of the dirt lip 72 to reduce the friction between that edge and the sealing surface 58 of the shield 42. The dirt lip 72 serves primarily to exclude dirt, moisture, and other contaminants from the sealed cavity 38, so that the raceways 22 and 28 and the rollers 34 in that cavity are not damaged by such contaminants. In addition the dirt lip 72 creates a back pressure when lubricant migrates into the area under the cylindrical face 80 of the pumping labyrinth 70. This back pressure minimizes the amount of lubricant that can enter this area and forces some of the lubricant into engagement with the pumping cavities 86, resulting in the return of the lubricant to the sealed cavity 38. During starts and stops in operation and also when the speed rotation is so slow that the pumping cavities 86 are ineffective in returning the lubricant to sealed cavity 38, the shallow groove 76 adjacent to the dirt lip 72 is partially filled with lubricant which provides lubrication to sealing edge 98 of the lip 72 when the speed of rotation increases.

The grease-type lubricant also exists in the larger grooves 78 as the ring r of grease, and indeed the lubricant in this region actually spans the space between the elastomeric seal element 46 and the portion of the sealing surface 58 that lies along the radial end wall 54, adhering to the latter better than the former. Thus, when the shield 42 rotates relative to the seal 40, the lubricant tends to remain with the end wall 54 of the shield 42 and slips over the smooth surfaces on the seal element 46. This ring r of lubricant presents a barrier to the passage of contaminants along the sealing surface 58 and indeed prevents many contaminants from reaching the dirt lip 72 where a more positive barrier exists. Contaminants, particularly dirt, become entrained in the ring r of grease that is in the larger groove 78, and this dirt causes the grease to adhere even more effectively to the end wall 54 of the shield 42, yet does not significantly inhibit its ability to slide circumferentially over the seal element 46.

Should the pressure within the sealed cavity 38 increase during normal operation of the bearing A, this increase in pressure will be transmitted through the clearance c between the pumping labyrinth 70 and the sealing surface 58 and through the vent apertures 92 into the shallow groove 76 between the labyrinth 70 and the dirt lip 72, and if great enough will lift the dirt lip 72 slightly to transmit the increase in pressure to the larger groove 78 between the two lips 72 and 74. The grease that forms the ring r in the larger groove 78 may be pliable enough to provide a vent passage of its own to the space between the flinger lip 74 and the overhang 56 of the shield 42 or to one or several of the notches 112 in the secondary lip 74.

Usually an increase in pressure within the shallow groove 76 is accompanied by the extrusion of lubricant from the shallow groove 76, beneath the dirt lip 72 and into the larger groove 78. This extruded lubricant expands the ring r of lubricant in the larger groove 78 and forces the flinger lip 74 outwardly, causing its edge 110 to bear against the axial section of the sealing surface 58 that is along the overhang 56 of the shield 42. Thus, an increase in the pressure of the lubricant within the larger groove 76 occurs, but the pressure is limited to the pressure resistance of the lubricant in or adjacent to the venting notches 112, and eventually the lubricant in the larger groove 78 returns to ambient pressure. This temporary pressurization of the larger groove 78 reduces the leakage of lubricant past the dirt lip 72, and thus serves to retain the lubricant in the annular cavity 38. It further serves to retain the lubricant in the larger groove 78 during transitory elevations in pressure, and this in turn maintains the effectiveness of the lubricant ring r as a barrier to the ingress of contamination along the radial end wall 54 of the shield 42.

The magnitude of a temporary increase in pressure within the lubricant of the larger groove 78 is controlled by the size and number of the venting notches 112. They are such that the secondary lip 74 will stop or reduce leakage beyond the lips 72 and 74, when very small pressure increases of short duration occur. This results in a temporary increase in heat and torque due to friction between the secondary lip 74 and the overhang 56. Sustained pressurization of the larger groove 78 will not exist, because venting will occur through the venting notches 112. Should the notches 112 become clogged with lubricant, the heat generated by the sustained contact between the secondary lip 74 and the sealing surface 58 of the shield 42 both increases the pressure of the lubricant and further softens the lubricant so that it flows out of the notches 112, thus reestablishing the notches 112 as effective vents. In this regard, the notches 112 disrupt the edge 110 so that an elastohydrodynamic oil film does not develop between it and the sealing surface 58, and as a consequence the contact which occurs assures a rapid rise in the temperature of the secondary lip 74.

The overhang 56 serves to protect the seal element 46, so the seal assembly B classifies as a shielded seal. Moreover, when the axle 4 turns, the overhang 56 of the shield 42 of course functions as a flinger which hurls water and other contaminants away from the seal assembly B and thereby inhibits such contaminants from entering the gap g.

Since the seal assembly B in normal operation maintains frictional contact between its seal 40 and shield 42, at only one location, that is along the lightly biased dirt lip 72, little torque is needed to rotate the shield 40 relative to the seal 40. Indeed, the seal 40 requires considerably less torque than conventional seals with radial lips biased under the force of a garter spring. Yet the barrier to the passage of lubricant and contaminants is just as effective. The seal A is thus ideally suited for use on journal bearings of railway cars.

This invention is intended to cover all changes and modifications of the example of the invention herein chosen for purposes of the disclosure which do not constitute departures from the spirit and scope of the invention.

What is claimed is:

1. In combination with a sealing surface having an overhanging section that is presented inwardly toward an axis of rotation, a seal for establishing a barrier with the sealing surface so as to isolate a region generally between two components, one of which carries the seal and the other the sealing surface, when relative rotation exists between the components, said seal comprising a labyrinth having a first face that is presented toward the sealing surface and a second face that is presented toward the isolated region; a flexible dirt lip contacting the sealing surface beyond the labyrinth; and a secondary lip extended toward the overhanging portion of the sealing surface, the labyrinth, dirt lip and secondary lip being arranged along the sealing surface in that order away from the isolated region.

2. The combination according to claim 1 wherein the secondary lip is normally spaced from the overhanging portion of the sealing surface.

3. The combination according to claim 1 wherein the overhanging section of the sealing surface extends generally axially; wherein the section of the sealing surface toward which the first face of the labyrinth is presented and against which the dirt lip bears also extends generally axially but is located radially inwardly from the overhanging section and is spaced away from the axis of rotation.

4. The combination according to claim 3 further comprises a ring of grease-type lubricant between the seal and the sealing surface along that region of the seal that is between the dirt lip and the secondary lip.

5. The combination according to claim 4 wherein the secondary lip is flexible and normally spaced from the overhanging portion of the sealing surface, but will distort against the sealing surface when forced outwardly.

6. The combination according to claim 5 wherein the secondary lip has outwardly opening notches in the region thereof where it contacts the overhanging section of the sealing surface so as to vent the region between the two lips when the secondary lip is distorted against the sealing surface.

7. The combination according to claim 1 wherein the first face of the labyrinth is spaced from the sealing surface.

8. The combination according to claim 1 wherein the labyrinth, the dust lip, and the secondary lip are all formed from a flexible material.

9. The combination according to claim 1 and further comprising a shield on which the sealing surface is located; and wherein the seal is captured on the shield.

10. The combination according to claim 1 wherein the secondary lip has a concave surface that is presented radially outwardly so as to direct water away from that end of the lip which is presented toward the overhanging section of the sealing surface.

11. The combination according to claim 11 wherein the labyrinth has pumping cavities which open out of the first and second faces, each pumping cavity having a face which is presented oblique to the direction of relative rotation between the labyrinth and the sealing surface and is wider at the second surface than remote from the second surface, so that a lubricant which enters the cavity will be deflected out of it and into the isolated region by reason of the relative rotation between the components.

12. A seal assembly comprising: a shield and a seal which cooperates with the shield to establish a barrier when relative rotation exists between the shield and the seal about an axis of rotation; the shield having inner and outer axial portions which are directed generally axially and a generally radial portion which extends between and connects the axial portions, and also having a sealing surface along such portions; the seal including a case and a labyrinth, flexible dirt lip and a secondary lip all attached to and carried by the case with the dust lip being located between the labyrinth and the secondary lip, the labyrinth being presented toward, but spaced from the section of the sealing surface that is on the inner axial portion of shield, the dirt lip being oblique to and actually contacting the sealing surface, the secondary lip projecting toward the section of the sealing surface that is along the outer axial portion of the shield.

13. A seal assembly according to claim 12 wherein the dirt lip is directed generally away from the pumping labyrinth and contacts the section of the sealing surface that is along the inner axial section of the shield.

14. A seal assembly according to claim 13 and further comprising a groove between the dirt and secondary lip with the groove opening toward the radial portion of the shield.

15. A seal assembly according to claim 14 and further comprising a ring of a grease-type lubricant in the groove and extending out to the section of the sealing surface that is along the radial portion of the shield.

16. A seal assembly according to claim 13 wherein the secondary lip has a free end that normally lies inwardly from the section of the sealing surface that is along the outer axial portion of the shield, but the secondary lip is flexible and can be distorted outwardly so that at its free end it contacts the sealing surface along the outer axial portion of the shield.

17. A seal assembly according to claim 16 wherein the secondary lip has an edge at its free end and contains vent notches which open out of the edge toward the outer axial portion of the shield.

18. A seal according to claim 17 wherein the secondary lip is presented obliquely with respect to the section of the sealing surface along the outer axial portion of the shield and has a concave outwardly presented surface so that water which comes against that surface will not flow toward the free end of the secondary lip.

19. A seal assembly according to claim 12 in combination with a bearing having an inner race and an outer race, the seal case being fitted to the outer race and the shield being fixed in position with respect to the inner race.

20. A rotary seal for establishing a barrier along a sealing surface that extends around an axis of rotation, said seal compressing a rigid seal case; a pumping labyrinth attached to the seal case and having a first face presented toward the axis of rotation and a second face located at a substantial angle with respect to the first face, the pumping element further containing wedge shaped pumping cavities, with each cavity opening out of both the first and second faces and being larger at the first face than remote from the first face so that the cavity will impel, generally axially, a lubricant that enters it when relative rotation occurs between the seal and the sealing surface; a dirt lip attached to the seal case and projecting generally away from the pumping labyrinth and toward the axis of rotation oblique to that axis, the dirt lip having a free end, the diameter of which is less then the diameter of the first face of the pumping labyrinth; and a secondary lip attached to the seal case and projecting generally away from the dirt lip and the axis and being generally oblique to that axis.

21. A seal according to claim 20 wherein the pumping element, the dust lip and the secondary lip form part of a unitary seal element which is formed from a flexible material that is bonded to the seal case.

* * * * *